(United States Patent Office — 3,297,495 — Patented Jan. 10, 1967)

3,297,495
PROCESS AND COMPOSITION FOR PHOSPHATIZING METALS

William J. Vullo, Tonawanda, N.Y., and Donald H. Campbell, Niagara-on-the-Lake, Ontario, Canada, assignors to Hooker Chemical Corporation, Niagara Falls, N.Y., a corporation of New York
No Drawing. Filed Nov. 29, 1962, Ser. No. 241,016
The portion of the term of the patent subsequent to Nov. 30, 1982, has been disclaimed
19 Claims. (Cl. 148—6.17)

This application is a continuation-in-part of our copending application, Serial Number 165,303, filed January 10, 1962, now Patent No. 3,220,890.

This invention is directed to a process and composition for phosphatizing metals. More particularly, this invention is directed to an improved, substantially water-free phosphatizing liquid, and to the process for applying phosphate coatings to metal surfaces with such a phosphatizing liquid.

Phosphate coatings are applied to metal surfaces to prevent oxidation of the metal and to condition the metal surfaces for applying paint finishes. Metal surfaces should be free from rust, oil and other extraneous substances in order to obtain a satisfactory phosphate coating. Therefore the metal is cleaned in inorganic solutions such as hot alkaline solutions, in organic solutions such as chlorinated hydrocarbons, or otherwise cleaned prior to phosphatizing. In one prior art method of cleaning, metal articles which may be coated with a film of rust-preventative oil, called slushing oil, are first subjected to a degreasing operation in which oil and extraneous materials are removed by contacting the metal with a chlorinated hydrocarbon such as trichloroethylene, perchloroethylene, and trichloroethane in liquid and/or vapor form.

In the prior art several methods for applying phosphate coatings to metal surfaces have been used. A first method, which is referred to as the "aqueous" method, generally requires cleaning in a hot alkaline solution, rinsing, immersing in a hot aqueous phosphatizing solution, again rinsing, immersing in chromic acid, and then drying. Among the many drawbacks of such a process has been the disadvantage of requiring a large number of time-consuming and expensive operating steps. In addition to this disadvantage, sludge rapidly builds up in the aqueous phosphatizing solution, thereby inhibiting the effectiveness of the phosphatizing bath, and impairing the quality of the phosphate coating. There is another class of phosphatizing compositions which has been referred to as non-aqueous compositions, since members contain little or no water. (When reference is made to "non-aqueous" in this disclosure, it is understood to mean those that contain little or no water.) One such composition consists of a solution of phosphoric acid, acetone or an alcohol, and sufficient carbon tetrachloride to raise the flash point of the composition to about fifty-four degrees centigrade. Due to the low boiling point of this type of non-aqueous phosphatizing solution, solvent loss through evaporation is appreciable, and reaction times are long when heavier phosphate coatings are desired. Furthermore, the low flash point is quite undesirable. Another type of non-aqueous phosphatizing composition consists of phosphoric acid, an alkyl acid phosphate, and a chlorinated hydrocarbon solvent. Alkyl acid phosphates, however, are relatively expensive, interfere with the titrimetic determination of phosphoric acid concentration, may react with the metals being phosphated, and may deposit on the phosphate coating surface and thereby impair certain properties of subsequently applied films of paint and laquer.

A third type of non-aqueous phosphatizing composition consists of phosphoric acid, an alcohol and a relatively high proportion of chlorinated hydrocarbon such as trichloroethylene. Such compositions, though overcoming many of the disadvantages of aqueous and other types of non-aqueous phosphatizing solutions, still have certain undesirable features. For example, sludge develops and results in loosely adsorbed crystalline deposits on the phosphated surfaces. Also, decomposition of the chlorinated solvent and resultant formation of HCl occur.

It is an object of this invention to provide an improved composition for phosphatizing metals.

Still another object of this invention is to provide an improved phosphatizing composition which is relatively non-flammable and which is substantially water-free.

A further object of the invention is to provide an improved phosphatizing composition containing a novel coating controller which results in the formation of firm, uniform, fine-grained, gray, microcrystalline phosphate coatings on metal surfaces.

It is a further object of the invention to provide a novel phosphatizing composition which contains organic coating controllers and acid solubilizers which are substantially non-reactive with metals.

It is a still further object of this invention to provide a chlorinated hydrocarbon phosphatizing solution which is effectively stabilized against oxidation and decomposition.

These and other objects of the invention will be apparent from the following detailed description.

It has now been discovered that firm, uniform, fine-grained, gray microcrystalline phosphate coatings are formed on metal surfaces when the metal surfaces are contacted with a substantially anhydrous solution of a chlorinated hydrocarbon, phosphoric acid (strength ninety-one to one hundred percent), a cosolvent capable of dissolving phosphoric acid in the chlorinated hydrocarbon, and a lower alkyl substituted thiourea compound. In addition, metals coated with such a solution can be readily painted with a wide variety of painting materials to yield a finish having improved resistance to corrosive atmospheres.

When the N,N'-lower alkyl thiourea compound is omitted from the phosphatizing bath, and phosphatizing is effected using phosphoric acid which contains significant amounts of water, the resulting phosphate coatings are porous, macrocrystalline, thick, non-uniform, tacky, and otherwise unsatisfactory. When the lower alkyl thiourea compound is omitted from the phosphatizing bath, and the phosphatizing is effected using phosphoric acid containing little or no water, as ninety-one to one hundred percent phosphoric acid, sludge develops rapidly in the phosphatizing solution. By sludge we mean metal phosphate suspended in the solution, which develops during the phosphatizing. Sludge is undesirable since it adheres loosely to phosphate coatings, impairing the appearance and adhesion of subsequently applied films of paint and lacquer.

Any metal of the class capable of reacting with phosphoric acid to form the corresponding metal phosphate can be treated in accordance with the phosphatizing composition and method of the present invention. The following metals can be listed as exemplary of those which are suitable for treating according to the present invention: iron, aluminum, zinc, magnesium, cadmium, alloys containing two or more of these metals, etc.

Prior to phosphatizing, the metal is cleaned by any suitable means such as by employing a degreasing solvent, e.g., chlorinated hydrocarbons, to remove oil and extraneous material from the metal surfaces. The chlorinated hydrocarbon is preferably maintained at or near its boiling point, and the metal to be cleaned is contacted with the liquid phase and/or the vapor phase of the said chlorinated hydrocarbon. The metal article, which has been cleaned in the chlorinated hydrocarbon or otherwise cleaned, is then contacted with a phosphatizing solution, which contains the following ingredients in the following proportions:

| Component | Percent By Weight | Preferred Percent By Weight |
| --- | --- | --- |
| Phosphoric Acid (91–100%) | 0.1 to 2.0 | 0.2 to 1.5. |
| Lower Alkyl Substitute Thiourea compound. | 0.0001 to 0.2 | 0.0001 to 0.02. |
| Cosolvent | 3.0 to 12.0 | 5.0 to 9.0. |
| Chlorinated Hydrocarbon | 88 to 97 | 91 to 95. |
| Stabilizers | Up to 1.6 | 0.1 to 0.9. |

Other additives, coating modifiers, and/or other substances may be added to enhance, synergize or improve the composition of this invention.

*Chlorinated hydrocarbon.*—The chlorinated hydrocarbon solvent provides a substantially water-free non-flammable reaction medium for the phosphatizing reaction wherein the phosphate coating is produced on the surfaces of the metal. Any chlorinated hydrocarbon normally employed as a degreasing solvent can be employed as the non-flammable reaction medium component of the phosphatizing solution and process according to the present invention. The following chlorinated hydrocarbons can be listed as exemplary of those which are suitable for use in the compositions according to the present invention: trichloroethylene, perchloroethylene, trichloroethanes, tetrachloroethanes, methylene chloride, ethylene chloride, ethylidene chloride, dichlorotetrafluoroethanes, trichlorotrifluoroethanes, trichlorodifluoroethanes, tetrachlorodifluoroethanes, fluorotrichloromethane, fluoropentachloroethane, methyltrichloroethylene, 1,2-dichloropropane, 1,2-dichloropropene, 1,1,2-trichloropropane, ethyltrichloroethylene, and mixtures thereof as will be noted, they are usually of 1 to 4 carbon atoms and 1 to 6 halogen atoms. Of these, the preferred chlorinated hydrocarbon solvent is trichloroethylene. Since the chlorinated hydrocarbons are relatively non-flammable and have relatively high flash points compared to other organic solvents, such as alcohols, it is preferred to use the highest proportion of chlorinated hydrocarbon in the phosphatizing bath which is consistent with obtaining smooth, uniform phosphate coatings on the metal surfaces. The phosphatizing compositions, employing trichloroethylene as the preferred non-flammable reaction medium, which have about ninety-one to ninety-gve percent by weight of trichloroethylene produce phosphate metal coatings which are quite satisfactory. Phosphatizing compositions containing about ninety-one to ninety-five percent by weight of trichloroethylene are preferred for use in accordance with this invention.

*Phosphoric acid component.*—It is preferred to employ high strength phosphoric acid, in the form of orthophosphoric acid such as phosphoric acid having a concentration of 91 to 100% phosphoric acid and more preferably 96 to 100% phosphoric acid, that is phosphoric acid having zero to four percent water. Orthophosphoric acid of ninety-eight percent concentration is greatly preferred for use as the phosphoric acid component in the phosphatizing composition and method according to this invention. The "phosphatizing proportion," viz, the weight concentration of phosphoric acid in the phosphatizing composition can be between about 0.1 and about 2.0 percent, and preferably between about 0.2 and about 1.5 percent by weight of the phosphatizing solution. The orthophosphoric acid which is employed is essentially anhydrous $H_3PO_4$ having little or no water content. The elimination of substantial amounts of water in the phosphoric acid is quite important since the presence of water tends to interfere with the phosphatizing operation, and deleteriously affects the phosphate coatings by resulting in coatings having non-uniform, inconsistent coating weights, and under some conditions results in very rough, heavy coatings. The presence of substantial amounts of water also favors the development of sludge which interferes with the phosphatizing.

Essentially pure orthophopsoric acid can be provided in several ways including, among others, using anhydrous orthophosphoric acid at the outset; by distilling off as a water-chlorinated hydrocarbon azeotrope water introduced by the use of less than ninety-six percent phosphoric acid; by salt drying of phosphatizing solutions made from phosphoric acid of less than ninety-six percent strength, or by introducing minor amounts of iron powder into warm phospatizing solutions made from phosphoric acid of less than ninety-six percent or in any other fashion whereby the orthophosphoric acid in the phosphatizing solution has a strength of about ninety-six to one hundred percent.

The most preferred concentration of orthophosphoric acid is ninety-eight percent, and the preferred way of attaining this concentration in the phosphatizing solution is to employ ninety-eight percent orthophosphoric acid. Thus an effective phosphatizing solution can be prepared by dissolving ninety-eight percent phosphoric acid in butanol, and adding trichloroethylene and the lower alkyl substituted thiourea compound thereto.

Ninety-eight percent orthophosphoric acid can be prepared from eight-five percent phosphoric acid and $P_2O_5$ or polyphosphoric acid by conventional methods. This can then be used directly to prepare essentially anhydrous phosphatizing solutions which require no further drying.

*Cosolvent for concentrated phosphoric acid and chlorinated hydrocarbon.*—Since concentrated phosphoric acid is insoluble in chlorinated hydrocarbons, a cosolvent is employed in the proportions indicated in the preceding table, in order to dissolve the phosphoric acid in the chlorinated hydrocarbon. Any aliphatic or alicyclic alcohol capable of dissolving phosphoric acid in the chlorinated hydrocarbon solution can be employed.

Typical examples of suitable alcohols include those alcohols containing between one and about eighteen carbon atoms such as: methyl alcohol, ethyl alcohol; n-propyl alcohol; isopropyl alcohol; n-butyl alcohol; isobutyl alcohol; tertiary butyl alcohol; secondary butyl alcohol; n-amyl alcohol; secondary amyl alcohol; isoamyl alcohol; tertiary amyl alcohol; cyclohexyl alcohol; octyl alcohol; decyl alcohol; lauryl alcohol; stearyl alcohol; and mixtures of any two or more of the above-mentioned alcohols.

Other cosolvents, capable of dissolving the phosphoric acid, may be used in place of or in addition to the above alcohols. Such solvents include acid alkyl phosphates, such as octyl acid phosphate; halogenated alcohols, such as 2-chloroethanol; alkyl acetates, such as ethyl acetate, amyl acetate and the like; amides, such as N,N-dimethylformamide, and dimethyl acetamide; dioxane; monoethers of polyalkylene oxide glycols, such as the cellosolves and carbitols; ketones, such as acetone and methyl ethyl ketone; dialkyl sulfoxides, such as dimethyl sulfoxide; triamylphosphate; and triamylphosphite. Of all the above cosolvents, the alcohols are preferred.

Since the solubility of phosphoric acid is less pronounced in the higher alcohols than in the lower alcohols it is generally preferable to employ an alcohol having less than about ten carbon atoms, and more preferably between two and about six carbon atoms. This is illustrated by the data below which lists under the column headed Phosphoric Acid-Trichloroethylene Solubilizing Power, the percent (by volume) of cosolvent required to dissolve one volume percent of 85% phosphoric acid in trichloroethylene, a typical chlorinated hydrocarbon.

| Cosolvent: | Phosphoric acid-trichloroethylene solubilizing power, percent |
|---|---|
| Methyl alcohol | 20 |
| Ethyl alcohol | 10 |
| n-Propyl alcohol | 8 |
| i-Propyl alcohol | 10 |
| n-Butyl alcohol | 7 |
| i-Butyl alcohol | 9 |
| s-Butyl alcohol | 10 |
| t-Butyl alcohol | 9 |
| n-Amyl alcohol | 13 |
| t-Amyl alcohol | 12 |
| i-Amyl alcohol | 14 |
| Cyclohexyl alcohol | 11 |
| n-Octyl alcohol | 19 |
| 3-Chloropropanol | 40 |
| Acetone | 52 |
| Ethyl acetate | 58 |
| Dioxane | 58 |
| Triamyl phosphate | 31 |
| Triamyl phosphite | 31 |
| n-Octyl acid phosphate | 60 |
| N,N-dimethylformamide | 29 |

The preferred alcohol for use as a cosolvent for orthophosphoric acid and chlorinated hydrocarbons is n-butyl alcohol. Normal butyl alcohol offers several advantages over other alcohols. First, as indicated by the immediately preceding table, it takes less n-butyl alcohol than any other of the simple alcohols to dissolve a given amount of phosphoric acid in a chlorinated hydrocarbon. Hence, with n-butyl alcohol as the cosolvent the concentration of alcohol can be maintained low enough to preserve the desirable nonflammable character of the chlorinated hydrocarbon phosphatizing solution. Secondly, when trichloroethylene is employed as the chlorinated hydrocarbon, a butanol-trichlroethylene azeotrope forms which boils at about 86.8 degrees centigrade. This is just below the boiling point of trichloroethylene (which is about 87 degrees centigrade). On the other hand the azeotropes formed between trichloroethylene and many other alcohols boil at lower temperatures, resulting in larger solvent losses and in longer phosphatizing times. Thirdly, the n-butyl alcohol-trichloroethylene azeotrope contains only about 2.5 percent by weight of n-butyl alcohol, thus causing the concentration of alcohol in the phosphatizing solution to increase when the initial concentration of alcohol in the phosphatizing solution is greater than about 2.5 percent by weight. Therefore depletion of the alcohol in the phosphatizing bath, which depletion can cause the undesired formation of two liquid phases due to the insolubility of phosphoric acid in the chlorinated hydrocarbon, is avoided and the need for close control of the concentration of alcohol in the phosphatizing bath is greatly reduced.

The cosolvent can be employed in amounts of about 3.0 to 12.0 percent by weight, and more preferably 5.0 to 9.0 percent by weight of the phosphatizing composition. The preferred cosolvent is n-butyl alcohol.

*Stabilizer.*—It is, of course, important that the composition of this invention be stable under the conditions of use. To this end stabilizers are included which operate effectively in an acidic medium and do not deleteriously effect the phosphate coatings applied. In the composition of this invention a polyhydroxy aromatic compound provides the major stabilization although other stabilizing additives can be present as well. The polyhydroxyaromatic compound is preferably either a polyhydroxybenzene or a polyhydroxynaphthalene. In the latter case, the hydroxy groups can both be located on the same ring or on separate rings. The polyhydroxyaromatic compound used may be substituted with one or more alkyl groups having from one to five carbon atoms. While it is preferred to use a polyhydroxy aromatic compound containing two to three hydroxy groups, and two aromatic rings, it will be appreciated that compounds containing more than three hydroxy groups and two aromatic rings may be used, provided they are effective as stabilizers and do not deleteriously affect the phosphate coatings applied.

In the most preferred composition of this invention a dihydroxy benzene having one of the following formulae is used:

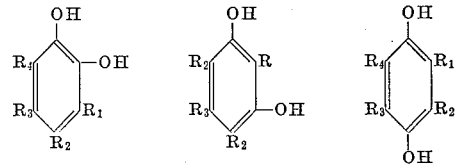

wherein $R_1$, $R_2$, $R_3$ and $R_4$ are substituents selected from the group consisting of hydrogen and lower alkyl groups having one to five carbon atoms. It is specifically preferred to use 4-tert. butyl pyrocatechol in the composition of this invention, for the practical reason that its concentration can be accurately and readily determined, even in a chlorinated hydrocarbon-phosphatizing solution. A red color is formed on addition of base and the concentration is measured colorimetrically. However, other typical examples of polyhydroxy aromatics which are considered to be suitable include: resorcinol, hydroquinone, pyrocatechol, 3-methylpyrocatechol, 4-ethylpyrocatechol, 3-tertiary amylpyrocatechol, 3,5-dimethylpyrocatechol, 3,4-dimethylpyrocatechol, 4,5 - diethylpyrocatechol, 3,4,5 - tributylpyrocatechol, 3,4,6-trimethylpyrocatechol, 2-methylresorcinol, 4-methylresorcinol, 5-tertiaryamylresorcinol, 4,5-ditertiary butylresorcinol, 4,6-dimethylresorcinol, 2-methyl - 4,6 - ditertiarybutylresorcinol, 2-methylhydroquinone, 2,3-dimethylhydroquinone, 2,6-diethylhydroquinone, 2,3-ditertiaryamylhydroquinone, 2,3,5-trimethylhydroquinone, 1,2-dihydroxynaphthalene, 5,6-dimethyl-1,2-dihydroxynaphthalene, 1,5-dihydroxynaphthalene, 3-tert, butyl-1,5 - dihydroxynaphthalene, 3,4-dimethyl-1,5-dihydroxynaphthalene, 1,6-dihydroxynaphthalene, 4,5-dipropyl-1,6-dihydroxynaphthalene, 1,2,3-benzenetriol, 1,2,4-benzenetriol, 1,3,5-benzenetriol, 1,2,3-trihydroxynaphthalene, 1,2,6-trihydroxynaphthalene and 1,2,7-trihydroxynaphthalene.

As noted above, other stabilizers can be added to the composition of this invention as desired; the only important consideration is that such an added stabilizer should have no deleterious effect on the phosphatizing process or coatings. One such stabilizer is diisobutylene which has been added to the composition of this invention. The major role of this substance is to serve as a co-boiling stabilizer which protects the chlorinated hydrocarbon vapors. Furthermore, it provides stabilization during distillation and recovery processes to which the composition of this invention is subjected and during which higher boiling stabilizers are separated from the chlorinated hydrocarbon.

*Lower alkyl substituted thiourea compound.*—The term lower alkyl substituted thiourea compound as used herein is intended to denote thiourea compounds of the formula

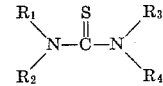

wherein $R_1$, $R_2$, $R_3$ and $R_4$ can be hydrogen, or a lower alkyl group (one to four carbon atoms) with the proviso that at least one of the substituents $R_1$, $R_2$, $R_3$ and $R_4$ is a lower alkyl group. Typical examples of suitable lower alkyl substituted thiourea compounds include: methylthiourea; ethylthiourea; n-propylthiourea; n-butylthiourea; isopropylthiourea; isobutylthiourea; tertiary butylthiourea; N,N'-dimethylthiourea; N,N'-diethylthiourea; N,N'-di-n-propylthiourea; N,N'-di-n-butylthiourea; N,N'-diisopropylthiourea; N,N,N'-tripropylthiourea; N,N,N'-tri-n- butylthiourea; N,N,N',N' - tetramethylthiourea; N,N,N', N'-tetraethylthiourea; N,N,N',N'-tetrapropylthiourea; N, N,N',N'-tetra-n-butylthiourea; N,N-dimethyl - N',N' - diethylthiourea; N,N-diethyl-N',N'-dipropylthiourea; N,N-dimethyl-N',N'-di-n-butylthiourea; N,N' - dimethyl-N,N'-diethylthiourea and the like. The lower alkyl substituted thiourea compound can be one wherein the lower alkyl substituents can all be the same or different. Moreover, the said formula includes both symmetrical and unsymmetrical lower alkyl substituted thioureas. The term lower alkyl as used herein is intended to denote alkyl groups having from one to four carbon atoms.

While a variety of lower alkyl substituted thiourea compounds can be employed in the method and composition according to the instant invention, the most preferred alkylthiourea compound for use in the present invention is N,N'-diethylthiourea.

In addition to phosphoric acid, an alcohol, chlorinated hydrocarbon and the alkyl thiourea compound, the phosphatizing solution may contain other additives, such as, coating modifiers, stabilizers, etc. A phosphatizing compound having excellent phosphatizing properties has a composition such as that which follows:

| Constituent | Percent By Weight | Preferred Percent By Weight |
|---|---|---|
| Ninety-eight percent $H_3PO_4$ | 0.1 to 2.0 | 0.5 to 1.1. |
| n-Butyl alcohol | 3.0 to 12.0 | 5.6 to 6.6. |
| Trichloroethylene | 88.0 to 97.0 | 92.4 to 93.4. |
| Diisobutylene | 0.01 to 1.0 | 0.3 to 0.6. |
| 4-t-butylpyrocatechol | 0.001 to 0.4 | 0.01 to 0.04. |
| N,N'-diethylthiourea | 0.0001 to 0.2 | 0.001 to 0.005. |

In order to achieve the full measure and benefit of this invention the lower alkyl substituted thiourea compound is added to the phosphatizing solution in desired proportions. The alkylthiourea compound is employed in a percentage of at least 0.0001 to 0.2 percent by weight of the phosphatizing bath, and preferably in amounts of 0.001 percent to 0.005 percent by weight of the phosphatizing bath. It has been found that when a lower alkyl thiourea compound, such as one described hereinabove, is employed as an essential component of the phosphatizing solution in the proportions set forth above, and the phosphatizing solution is applied to metal surfaces, there results a smooth, uniform, hard, non-tacky, microcrystalline film of phosphate coating upon the metal surface. However, when the lower alkyl thiourea compound is omitted from the phosphatizing solution, sludge may develop quite rapidly in the phosphatizing solution during the treatment of metal surfaces. By sludge is meant metal phosphate suspended in the phosphatizing solution. Sludge is considered to be undesirable since it adheres loosely to phosphate coatings, impairing the appearance and adhesion of subsequently applied films of paint and lacquer. Also, the phosphate coatings produced in chlorinated hydrocarbon phosphatizing solutions not containing a lower alkyl thiourea show a much greater tendency to become sticky at moderate and high humidities than phosphate coatings applied in solutions containing a lower alkyl thiourea. All of these undesirable features, i.e., the development of sludge in the phosphatizing solution, the deposition of loose powdery substances on the phosphated surfaces, and the tendency of the phosphate coatings to become sticky on exposure to conditions of moderate and high humidities become much worse in chlorinated hydrocarbon phosphatizing solutions which contain phosphoric acid of strength less than about ninety-one percent. Hence an important feature of this invention is the employment of an alkyl thiourea and phosphoric acid of ninety-one to one hundred percent, more preferably of ninety-six to one hundred percent in halogenated hydrocarbon phosphatizing solution.

Some of the benefits obtained due to the presence of the lower alkyl substituted thiourea compounds in the phosphatizing bath are that the alkyl substituted thiourea compound: stabilizes the phosphatizing solution against breakdown; assists in controlling the rate at which the metal surface is converted to metal phosphate; yields lighter weight, firmer and more uniform phosphate coatings per unit area of phosphated metal surfaces; yields phosphate coatings which become less tacky when exposed to conditions of humidity, e.g., relative humidity of over sixty percent; aids in maintaining the compositional homogeneity of the phhosphatizing bath; reduces the rate at which sludge is developed in the phosphatizing solution; and offers a better phosphate base for paints to be applied thereto; etc. Other advantages of the inclusion of the lower alkyl substituted thiourea compounds in the phosphatizing composition will be apparent from the examples hereinbelow. In conducting the application of the phosphatizing coating, the degreased metal surface is contacted with the novel phosphatizing solution for a sufficient time, generally up to about thirty minutes, and more preferably for a period of between about 0.5 and about five minutes. The phosphatizing bath is maintained at a temperature of from about twenty degrees centigrade to the boiling point of the phosphatizing solution. More preferably the phosphatizing bath is maintained at a temperature from about fifty-five degrees centigrade to the boiling point of the phosphatizing solution, the higher temperatures being employed when the shorter contact times are used.

The phosphatized metal article, after removal from the phosphatizing bath, can be returned to the chlorinated hydrocarbon preliminary degreasing solution for a final rinse to remove excess phosphatizing solution. However this is seldom necessary since the phosphatized metal is generally substantially dry when removed from the phosphatizing bath. The phosphatized metal article, with or without rinsing, can be stored or used in its immediate condition. The phosphatized metal article can also be subjected to further treatment such as painting, lubricating, and the like. The phosphate-coated metals which result from employment of the composition and method of the present invention display admirable resistance to corrosion, and retain paint finishes in superior fashion, generally better than metal phosphatized by conventional aqueous or dry processes.

The following examples are presented to define the invention more fully without any intention of being limited to the specific materials, temperatures, times, and other conditions thereof. In the examples which follow, all parts and percentages are by weight unless otherwise indicated.

*Example 1*

Four phosphatizing solutions were prepared, having the same $H_3PO_4$ content but differing in the strength of phosphoric acid present and in the concentration of N,N'-diethylthiourea (DETU). The phosphatizing solutions of 98–100% phosphoric acid were prepared by dehydrating phosphatizing solutions of 85% phosphoric acid. The dehydration was accomplished by distillation with continuous return of the organic layer of the condensate layer to the pot; this is henceforth referred to as drying by azeotropic distillation. The compositions of these four phosphatizing solutions follows:

| | I | II | III | IV |
|---|---|---|---|---|
| 85% $H_3PO_4$ | 1.2 | 1.2 | | |
| 99±1% $H_3PO_4$ | | | 1.0 | 1.0 |
| n-Butanol | 6.1 | 6.1 | 6.1 | 6.1 |
| Trichloroethylene | 92.7 | 92.7 | 92.9 | 92.9 |
| DETU | | 0.019 | | 0.019 |

Low carbon, cold rolled 24 guage steel test panels, three inches by five inches, were vapor degreased in trichloroethylene and phosphatized in the above solutions. The appearance of the phosphate coatings was carefully noted. Phosphate coating weights were determined by the difference between the weights of the panels before and after removing the phosphate coatings in a stripping solution consisting of 36 grams of sodium hydroxide and 13 grams of sodium cyanide in one liter of water.

DATA

| Phosphatizing | | Phosphatizing Coating | |
|---|---|---|---|
| Solution | Conditions | Mg./ft.² | Appearance |
| I | 5 min./65° C | 2,170 | Thick, gray, course, blistered, sticky. |
| I | 3 min./85° C | 2,040 | Do. |
| II | 5 min./65° C | 57.7 | Thin, blue-gray, dry, smooth, many streak marks. |
| II | 3 min./85° C | 157 | Thin, gray, dry, very streaky. |
| III | 5 min./65° C | 76.4 | Thin, gray, dry, smooth, with 60% surface covered with loose white powder. |
| III | 3 min./85° C | 389 | Fine-grained, gray, dry covered with loose powder. |
| IV | 5 min./65° C | 61.2 | Thin, gray, dry, smooth, no streaks or powder. |
| IV | 3 min./85° C | 214 | Fine-grained, gray, uniform dry, no streaks or powder. |

The above data show that poor quality phosphate coatings were applied in the phosphatizing solution containing eighty-five percent phosphoric acid and no alkyl thiourea. The coatings were improved either by converting the acid to nearly anhydrous phosphoric acid or by the inclusion of an alkyl thiourea. However, the best phosphate coatings, i.e., coatings free from stickiness, blisters, loose powdery deposits, streak marks and other irregularities, were applied in the phosphatizing solution which contained both the anhydrous phosphoric acid and the alkyl thiourea.

*Example 2*

Ten 24 gauge steel panels five inches long and three inches wide were degreased in trichloroethylene at eighty-six degrees, then rinsed for thirty seconds in trichloroethylene vapors. Five of the degreased steel panels were immersed in a phosphatizing solution prepared as in Example 1 and containing 13.3 grams of ninety-eight to one hundred percent $H_3PO_4$, 1040.0 grams of trichloroethylene and 68.4 grams of n-butanol for a period of five minutes at sixty-five degrees centigrade and then rinsed for thirty seconds in trichloroethylene vapors. The iron phosphate coating weight was about one hundred and forty-nine milligrams per square foot; determined by stripping one of the said five test panels as in Example 1. The appearance of these phosphatized panels was quite gray and covered with loose, white, powdery sludge.

The remaining five degreased steel panels were subjected to immersion in a phosphatizing solution which contained the same materials specified above in the same proportions plus 0.2 gram of diethylthiourea. The said five panels were dipped for five minutes at sixty-five degrees centigrade. The iron phosphate coating weight was about fifty-three milligrams per square foot; determined by stripping one of the phosphated panels as in Example 1. The phosphate coatings on all of the panels were hard, dry, smooth and uniform in appearance and contained no loose deposits.

*Example 3.—Example of beneficial effect of N,N'-diethylthiourea in phosphatizing process and phosphate coatings*

Five phosphatizing solutions were prepared containing the following components in the quantities indicated: n-butanol (67.2 g.), 85% phosphoric acid (13.2 g.), trichloroethylene (1032 g.), diisobutylene (4.2 g.), 4-t-butylpyrocatechol (0.21 g.), and 0.0 g., 0.0021 g., 0.0105 g., 0.021 g., and 0.042 g., respectively, of N,N'-diethylthiourea. Solutions were dehydrated as in Example 1. The solutions were then heated to 86° C., and degreased steel panels (24 gauge, 3″ x 5″ bare steel Parker test panels) were dipped for 90 seconds into each of the solutions. The panels were weighed before and after phosphatizing in order to determine the gain in weight, this being less than but proportional to the weight of iron phosphate contained thereon. The phosphated panels were also inspected periodically to determine whether they became tacky on exposure to the same conditions of temperature (approximately 25° C.) and humidity (about 55 to 65% relative humidity).

SUMMARY OF DATA

| DETU Content of Phos. Solu. | Weight Gain on Phosphatizing | Remarks |
|---|---|---|
| 0 | 38.1 mg | Coating became tacky in 30 min. |
| 2.1 mg | 32.0 mg | Coating very slightly tacky in 45 min. |
| 10.5 mg | 31.7 mg | No tackiness. |
| 21.0 mg | 29.7 mg | Do. |
| 42.0 mg | 26.1 mg | Do. |

Hence, the above data show that DETU gives lighter weight coatings of the type which do not become tacky in exposure to air.

*Example 4.—Phosphatizing composition*

| Component: | Weight percent |
|---|---|
| 98% $H_3PO_4$ | 1.036 |
| n-Butanol | 6.06 |
| Trichloroethylene | 92.5 |
| Diisobutylene | 0.372 |
| 4-t-Butylpyrocatechol | 0.0186 |

A fifty gallon batch of phosphatizing solution conforming to the above composition was prepared by dissolving 98% phosphoric acid (2.87 kg.) in n-butyl alcohol (16.8 kg.) and adding trichloroethylene (257.8 kg.) containing diisobutylene (DIB) (1.03 kg.) and 4-t-butylpyrocatechol (4-t-BPC) (0.0515 kg.). The phosphatizing solution was boiled a few hours and then degreased steel test panels (as in Example 1) were dipped 90 seconds at 85° C. Two such panels gained 28.2 mg. and 25.8 mg., respectively, in weight. The metal phosphate coatings became tacky on standing for 20–30 minutes at a relative humidity of 53–63% and a temperature of 25° C.

After addition of 0.50 g. of N,N'-diethylthiourea to the bath, two steel test panels gained 22.0 and 18.7 mg. in weight, respectively, on being phosphatized by dipping for 90 seconds at 85° C. The phosphate coatings did not become tacky after several hours exposure to the above conditions of humidity and temperature.

*Example 5*

The following trichloroethylene phosphatizing solutions were prepared:

| Component | Percent by Weight | |
|---|---|---|
| | Solution V, g. | Solution VI, g. |
| 85% $H_3PO_4$ | 13.3 | 13.3 |
| n-Butyl alcohol | 68.4 | 68.4 |
| Trichloroethylene | 1,040 | 1,040 |
| N,N'-diethylthiourea | | 0.2 |

The acid strength was increased to 98+% by drying by azeotropic distillation. Vapor degreased steel panels were phosphated in each solution by dipping for five minutes at sixty-five degrees centigrade. The phosphated panels were rinsed for thirty seconds in trichloroethylene vapors, dip coated with a white alkyd enamel, baked for thirty minutes at 160° C., and aged several days. The panels were then subjected to a Reverse Impact Test conducted with a Gardner "Coveral" Mandrel Impact Tester in which a steel weight was dropped on the painted panels from various heights equivalent to the indicated lbs. per sq. inch of impact pressure. The extent of damage inflicted on each of these panels is shown below:

| Panel Treated In Solution | Inch-lbs. of Impact Pressure | | | | |
|---|---|---|---|---|---|
| | 10 | 25 | 50 | 100 | 150 |
| V (No DETU) | None | Shatter | | | |
| VI (contains DETU) | do | None | None | Slight break | Moderate break |

*Example 7*

A vapor degreased, steel test panel was phosphatized by dipping for five minutes at sixty-five degrees centigrade in solution V of Example 6. A second degreased steel panel was phosphatized by dipping for five minutes at sixty-five degrees centigrade in solution VI of Example 6. Both phosphated panels were vapor degreased, painted, cured and aged as in Example 6. They were then immersed for sixteen hours in distilled water held at seventy-two degrees centigrade, removed and rated for blister development according to the ASTM designation D714–54T. The panel that had been phosphated in the solution containing the DETU, solution VI, had a blister rating of 9—few, whereas the panel that had been phosphated in the solution which did not contain DETU, solution V, had a blister rating of 9—medium dense. Thus the top coat applied to the panel phosphated in an embodiment of this invention demonstrated a greater resistance to moisture.

From Examples 1 to 7 it is apparent that the phosphatizing solutions containing the lower alkyl substituted thiourea compound, diethylthiourea, resulted in thinner, non-tacky, more uniform, moisture resistant phosphate coatings which, when paint films were applied thereto, gave more flexible, impact resistant, paint films possessing better moisture resistance.

*Example 8*

Essentially one hundred percent $H_3PO_4$ was prepared by mixing 3.4 grams of $P_2O_5$ and 4.86 milliliters (8.10 grams) of eight-five percent phosphoric acid. To this was added 1040.0 grams of trichloroethylene, 68.6 grams of n-butyl alcohol, 4.2 grams of diisobutylene, 0.21 gram of 1,3-diethylthiourea, and 4.8 grams of nitrobenzene. The final solution had the following composition:

|   | Percent |
|---|---|
| 100 percent $H_3PO_4$ | 1.02 |
| n-Butyl alcohol | 6.06 |
| Trichloroethylene | 92.10 |
| Diisobutylene (stabilizer) | 0.37 |
| Diethylthiourea | 0.02 |
| Nitrobenzene (coating weight controller) | 0.43 |

Duplicate degreased steel panels were phosphatized by dipping for five minutes at sixty-five degrees centigrade. Small increments of distilled water were added and another pair of panels phosphatized. This procedure was repeated until a total of 2.0 grams of water had been added.

The appearance and coating weight by the method described in Example 1 were noted. One of each duplicate set of panels was placed in a one hundred percent humidity cabinet at 25± 3 degrees centigrade, and the amount of rust occurring after twenty-four and one hundred and thirteen hours' exposure was noted.

| Weight Percent $H_3PO_4$ [1] | Phosphate Coatings | | Exposure to 100% Humidity | |
|---|---|---|---|---|
| | Appearance | Weight (mg./ft.²) | Rust Area After 24 hrs. | Rust Area After 113 hrs. |
| 98.4±1.6 | Typical [2] | 20 | Trace | 15% |
| 97.0±1.5 | do | 41 | N.D. | N.D. |
| 95.1±1.6 | do | 22 | 1–2% | 5–10% |
| 93.6±1.3 | do | 55 | N.D. | N.D. |
| 92.2±1.2 | do | 89 | 75% | 80% |
| 90.7±1.2 | do | 72 | N.D. | N.D. |
| 89.2±1.2 | do | 94 | 90% | 95% |
| 87.8±1.1 | do | 144 | 98% | 98% |
| 85.6±1.2 | Heavy gray | 261 | 98% | 99% |
| 85.3±1.1 | Thick gray | 277 | 98% | 100% |
| 83.9±1.1 | do | 337 | N.D. | N.D. |

[1] Based on quantity of eighty-five percent $H_3PO_4$, $P_2O_5$, and water added.
[2] Hard, microcrystalline, blue-gray, uniform, smooth, dry coatings.
N.D.=Not Determined.

Example 8 serves to illustrate that in order to secure the advantages of this invention, the phosphoric acid used in the phosphatizing bath should have an $H_3PO_4$ content of ninety-one to one hundred percent by weight, and more preferably an $H_3PO_4$ content of at least about ninety-six percent by weight.

*Example 9*

The following solutions were prepared and dehydrated as in Example 1.

| | Weight Percent | |
|---|---|---|
| | Solution A | Solution B |
| 85% $H_3PO_4$ | 0.60 | 0.50 |
| n-Butanol | 6.1 | 5.1 |
| Methylchloroform | 93.3 | 94.2 |
| DETU | | 0.005 |
| DIB | | 0.17 |
| 4-t-BPC | | 0.017 |

Three by five inch steel test panels were vapor degreased and then phosphated in solutions A or B. Phosphated panels were inspected and coating weights determined by stripping off the coatings in an alkaline cyanide stripping solution. The development of sludge by the phosphatizing solutions was also noted.

DATA

| Panel No. | Phosphating Solution | Phos. Conditions | Coating Weight mg./Panel | Remarks |
|---|---|---|---|---|
| 1–9 | A | 1½ min./74±° C | | Coating very thin, no sludge. |
| 10 | A | 15 min./74±1° C | 45.3 | Sludge developing from panel 10 on (the first panel treated for 15 min.). Coatings heavy, gray; av. coat. weight 64.8 mg. |
| 11 | A | 15 min./74±1° C | 41.2 | |
| 12 | A | 15 min./74±1° C | 57.3 | |
| 13 | A | 15 min./74±1° C | 90.2 | |
| 14 | A | 15 min./74±1° C | 90.2 | |
| 15 | A | 15 min./74±1° C | 71.8 | |
| 16 | A | 15 min./74±1° C | 66.8 | |
| 17 | A | 15 min./74±1° C | 77.1 | |
| 1–5 | B | 2–5 min./74±1° C | | Coating very thin, sludge. |
| 6 | B | 15 min./74±1° C | 62.4 | No sludge.[1] |
| 7 | B | 15 min./74±1° C | 63.9 | Do.[1] |
| 8 | B | 15 min./74±1° C | 65.2 | Do.[1] |
| 9 | B | 15 min./74±1° C | 58.0 | Do.[1] |
| 10–13 | B | 15 min./74±1° C | | Do.[1] |
| Avg | | | 62.4 | |

[1] Coating heavy, gray, uniform.

*Conclusions.*—Although the coatings produced in solutions A and B were about the same in apparance and coating weight, the solution conforming to an embodiment of this invention, solution B produced phosphate coatings of more uniform weight and without the formation of troublesome sludge.

*Example 10*

The following solutions were prepared and dehydrated as in Example 1.

|  | Weight Percent | |
|---|---|---|
|  | Solution C | Solution D |
| 85% H₃PO₄ | 0.60 | 0.50 |
| n-Butanol | 6.1 | 5.1 |
| Perchloroethylene | 93.3 | 94.2 |
| DETU |  | 0.005 |
| DIB |  | 0.17 |
| 4-t-BPC |  | 0.017 |

|  | Solution X | Weight Percent | |
|---|---|---|---|
|  |  | Solution Y | Solution Z |
| 85% H₃PO₄ | 0.60 | 0.50 | 0.60 |
| n-Butanol | 6.1 | 5.1 | 5.1 |
| Trichloroethylene | 93.3 | 94.2 | 94.1 |
| DETU |  | 0.0017 | 0.0017 |
| DIB |  | 0.17 | 0.17 |
| 4-t-BPC |  | 0.017 | 0.017 |

Low carbon, cold rolled steel test panels, three inches by five inches, were vapor degreased in trichloroethylene and phosphatized by dipping for ninety seconds in at eighty-six degrees centigrade in solutions X, Y, and Z. The appearance and nature of the iron phosphate coatings and the tendency of phosphatizing solutions to develop sludge were noted. Iron phosphate coating weights were determined as in Example 1.

DATA

| Solution | Total Number Panels Treated | Phosphating Conditions | Iron Phosphate Coating Weight | | Rate of Sludge Development in Phosphate Solution |
|---|---|---|---|---|---|
|  |  |  | Average mg. per ft.² | Nature of Phosphate Coatings |  |
| X | 11 | 1½ min./86° C | 172 | Loose powdery coatings easily rubbed off substrate metal and tacky to the touch. | Sludge developed rapidly during and after treatment of 4th panel. |
| X |  | 3 min./86° C | 274 |  |  |
| Y | 20 | 1½ min./86° C | 148 | Dry to the touch. More adherent and darker (gray) in appearance than those from sol. X. | Sludge developed quite slowly after treatment of 14th panel. |
| Y |  | 3 min./86° C | 238 |  |  |
| Z | 5 | 1½ min./86° C | 141 | Same as Y | Same rate as for Y. |

Three by five inch steel test panels were vapor degreased and then phosphated by dipping in solutions C or D under the conditions specified below. The appearance and nature of the phosphate coatings and the relative tendencies of the solutions to develop sludge were noted. Iron pohsphate coatings were determined as in the previous example.

*Conclusions.*—Phosphate coatings applied in the embodiments of this invention, solutions Y and Z, were lighter in weight, less tacky in the touch, darker gray, and more adherent than the coatings produced in similar phosphatizing solution which is not an embodiment of this invention. Also there was no formation of sludge in the solutions representing embodiments of this invention.

DATA

| Panel | Phos. Soln. | Phos. Condition | Coating Weight, mg./Panel | Remarks |
|---|---|---|---|---|
| 1-3 | C | 1-3 min./90° C |  | Solution c. |
| 4 | C | 2 min./90° C |  |  |
| 5 | C | 2 min./90° C | 28.0 |  |
| 6 | C | 2 min./90° C | 32.3 |  |
| 7 | C | 2 min./90° C | 27.7 |  |
| 8 | C | 2 min./110° C | 37.0 | Coatings dry to touch; somewhat powdery |
| 9 | C | 2 min./106° C | 36.7 | Appreciable amount of sludge developing from panel #8 on. |
| 10 | C | 2 min./108° C | 41.7 |  |
| 11 | C | 2 min./110° C | 46.7 |  |
| 12-14 | C | 2 min./106/110° C |  |  |
| 1-4 | D | 2-5 min./90° C |  | Solution clear. |
| 5 | D | 2 min./90° C | 16.2 |  |
| 6 | D | 2 min./90° C |  |  |
| 7 | D | 2½ min./110° C |  | Coatings uniform, dry, slightly less powdery than those treated in solution C. |
| 8 | D | 2 min./110° C |  |  |
| 9 | D | 2 min./107° C | 33.0 |  |
| 10 | D | 2 min./109° C | 36.2 |  |
| 11 | D | 2 min./109° C | 37.8 |  |
| 12-21 |  | 2 min./106-110° C |  | No sludge. |

*Conclusions.*—Phosphate coatings produced in an embodiment of this invention, solution D, were less powdery than those produced in a similar solution which is not an embodiment of this invention. Furthermore, no sludge developed during use of the former phosphatizing solution.

*Example 11*

The following phosphatizing solutions were prepared and dehydrated as in Example 1.

*Example 12*

A phosphatizing solution was prepared from 98% phosphoric acid (1.17%), n-butyl alcohol (6.1%), diisobutylene (0.40%), 4-t-butylpyrocatechol (0.02%), and N,N'-diethylthiourea (0.002%); all percentages are by weight. The solution was heated to 86° C. and several different metal obects were dipped for 1½ minutes. The appearance of the treated surfaces was compared with untreated samples of the same metals to see whether phosphate coatings had formed.

Metal:               Appearance of treated surface
- Cadminum — Thin, dull gray coating, no tackiness.
- Tin — Thin, dull gray coating, no tackiness.
- Aluminum — Heavy, light gray coating, very slightly tacky.
- Galvanized — Thin, dull gray coating, no tackiness.
- Zinc — Heavy, dark gray coating, no tackiness.
- Magnesium — Thin, dark gray coating, no tackiness.

The phosphatizing solution remained free from sludge during the treatment of these metal objects.

*Example 13.*—Demonstrating the advantages of phosphatizing compositions containing various alkylthioureas.

*Solutions employed.*—A stock solution was prepared having the following composition:

| | Weight percent |
|---|---|
| Trichloroethylene | 92.5 |
| n-Butanol | 6.06 |
| 98% $H_3PO_4$ | 1.04 |
| 4-t-butylpyracatechol | 0.0186 |
| Diisobutylene | 0.372 |

This stock solution was divided into five portions and the following solutions prepared:
- Solution 1—stock solution
- Solution 2—stock solution plus 0.002 wt. percent N,N'-diethylthiourea
- Solution 3—stock solution plus 0.002 wt. percent N,N'-di-n-butylthiourea
- Solution 4—stock solution plus 0.002 wt. percent mono-n-butylthiourea
- Solution 5—stock solution plus 0.002 wt. percent tetramethylthiourea

*Treatment of panels.*—Low carbon, cold rolled steel test panels, three by five inches, were vapor degreased in thichloroethylene and phosphated by immersion for two minutes at eighty-seven degrees centigrade in solutions 1, 2, 3, 4 and 5. The appearance and nature of the phosphate coatings and the rate of sludge formation in the phosphatizing solutions were noted.

in the scope of this invention which has exhibited highly desirable properties is one comprising a chlorinated hydrocarbon, an alcohol, phosphoric acid, and a polyhydroxyaromatic compound, preferably a di- or tri-hydroxy aromatic compound. The following table will illustrate various proportions of these components in said phosphatizing composition.

| Component | Percent By Weight | Preferred Percent By Weight |
|---|---|---|
| Phosphoric Acid (91–100%) | 0.1 to 2.0 | 0.2 to 1.5. |
| Polyhydroxyaromatic compound | 0.001 to 0.4 | 0.01 to 0.04. |
| Cosolvent | 3.0 to 12.0 | 5.0 to 9.0. |
| Chlorinated Hydrocarbon | 88 to 97 | 91 to 95. |

Other additives, coating modifiers, and/or other substances may be added to enhance, synergize or improve the composition of this invention.

A preferred composition is:

| | Preferred percent by weight |
|---|---|
| 98% $H_3PO_4$ | 0.5 to 1.1 |
| Trichloroethylene | 92.4 to 93.4 |
| n-Butanol | 5.6 to 6.6 |
| 4-t-butylpyrocatechol | 0.01 to 0.04 |

*Examples 14 to 21.*—Demonstrating the stability of phosphatizing compositions containing various polyhydroxyaromatic compounds In these examples phosphatizing compositions were subjected to the combined degradative forces of heat, ultraviolet light, oxygen and finely divided iron powder in an accelerated test. Test samples having the following general composition were prepared:

| | | |
|---|---|---|
| Chlorinated hydrocarbon | volume percent | 89 |
| n-Butanol | do | 10 |
| Phosphoric acid | do | 1 |
| Polyhydroxyaromatic (samples 1 to 11) weight percent | | 0.03 |

The chlorinated hydrocarbon and polyhydroxyaromatic compound used in the test samples and the results of the stability testing are listed below:

Each two hundred milliliter sample was placed in a five hundred milliliter Ehrlenmeyer flask containing 0.1 gram iron powder. The flask was mounted on a heater adjacent to an ultraviolet light. The flask was fitted

SUMMARY

| Solution | Total Number Panels Tested | Weight Gain on Phosphatizing Average, mg./ft.² | Nature of Phosphate Coatings | Rate of Sludge Development in Phosphate Solution |
|---|---|---|---|---|
| 1 | 10 | 211 | Soft, light gray coating powdery and slightly tacky. | Sludge began to form during treatment of 5th panel and was heavy by the 9th panel. |
| 2 | 10 | 90 | Dark gray adherent coating, very, very slight powdering, not tacky. | No sludge after 10 panels. |
| 3 | 10 | 65 | Dark gray adherent coating, very slight powderiness, not tacky. | Do. |
| 4 | 10 | 127 | Dark gray adherent coating, very, very slight powderiness, not tacky. | Do. |
| 5 | 15 | 152 | do | Solution became hazy after 5th panel treated but no further development observed through to 15 panels. |

*Conclusion.*—The phosphatizing compositions containing the various alkylthioureas (solutions 2, 3, 4 and 5) produced beneficial effects in regard to the phosphatizing process that were not found when an alkylthiourea was absent (i.e. solution 1). These beneficial effects were— lighter weight, more adherent, non-tacky coatings and reduction in the rate of sludge formation.

A stabilized phosphatizing composition included within with a reflux condenser connected to a gas washing bottle containing two hundred milliliters of distilled water. During the four hour test period, a stream of oxygen (one hundred and seventy milliliters per minute) was passed into the refluxing sample and exited through the wash bottle. The extent of decomposition caused by the combined effects of heat, ultraviolet light; oxygen and iron powder was determined by titration of the contents of the wash bottle for evolved acid resulting from the decomposition of the chlorinated hydrocarbon solvent. This was combined with the chloride ion found in an aliquot of the tests sample. The total was expressed, for convenience, as milliliters of 1 N HCl formed. The results were rated as follows:

A. *Phosphatizing compositions containing trichloroethylene—*

Less than 2 mls. 1 N HCl formed _____ Good.
2 to 4 mls. 1 N HCl formed _____ Fair.
More than 4 mls. 1 N HCl formed _____ Bad.

B. *Phosphatizing compositions containing perchloroethylene—*

Less than 3 mls. 1 N HCl formed _____ Good.
3 to 6 mls. 1 N HCl formed _____ Fair.
More than 6 mls. 1 N HCl formed _____ Bad.

1. SAMPLES CONTAINING AN EMBODIMENT OF THIS INVENTION

| Sample Number | Chlorinated Hydrocarbon | Polyhydroxyaromatic | Mls. 1 N HCl formed | Rating |
|---|---|---|---|---|
| 1. (Example 14) | Trichloroethylene | 4-t-butylprocatechol | 1.53 / 1.54 / 1.74 | Good. / Do. / Do. |
| 2. (Example 15) | ___do___ | Hydroquinone | 0.96 / 0.63 | Good. / Do. |
| 3. (Example 16) | ___do___ | Resorcinol | 0.81 | Good. |
| 4. (Example 17) | ___do___ | Di-t-amylhydroquinone | 0.78 | Do. |
| 5. (Example 18) | ___do___ | 2,5-di-t-butylhydroquinone | 1.3 | Do. |
| 6. (Example 19) | ___do___ | Hydroquinone | 2.68 | Do. |
| 7. (Example 20) | ___do___ | 1,6-dihydroxynaphthalene | 0.63 | Do. |
| 8. (Example 21) | ___do___ | 1,5-dihydroxynaphthalene | 0.73 | Do. |
| 9. (Example 22) | Perchloroethylene | 1,2,3-benzenetriol | 0.32 | Do. |
| 10. (Example 23) | Trichloroethylene | 1,2,3-benzenetriol | 0.40 | Do. |
| 11. (Example 24) | ___do___ | 1,3,5-benzenetriol | 1.05 | Do. |

2. SAMPLES NOT CONTAINING EMBODIMENTS OF THIS INVENTION

| Sample Number | Chlorinated Hydrocarbon | Mls. 1 N HCl formed | Rating |
|---|---|---|---|
| 12 | Trichloroethylene | 16.9 | Very bad. |
| 13 | Perchloroethylene | 7.7 | Do. |

*Conclusion.*—The various phosphatizing compositions of Examples 14 to 24 have much greater stability when subjected to the combined effects of ultraviolet light, oxygen, heat and iron powder than do the similar phosphatizing compositions (Samples 12 and 13) not containing an embodiment of this invention.

While there have been described various embodiments of the invention, the compositions and methods described are not intended to be understood as limiting the scope of the invention, as it is realized that changes therewithin are possible, and it is further intended that each element recited in the following claims is to be understood as referring to all equivalent elements for accomplishing substantially the same results in substantially the same or equivalent manner, it being intended to cover the invention broadly in whatever form its principle may be utilized.

We claim:
1. A phosphatizing composition comprising a chlorinated lower aliphatic hydrocarbon, a cosolvent capable of dissolving phosphoric acid in the hydrocarbon phosphoric acid of a strength of at least about 91 percent, a polyhydroxyaromatic compound selected from the group consisting of polyhydroxybenzene and polyhydroxynaphthalene compounds, and a substance having the following general formula:

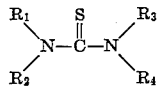

wherein $R_1$, $R_2$, $R_3$, and $R_4$ are substituents selected from the group consisting of hydrogen and lower alkyl groups having one to four carbon atoms and wherein at least one of the substituents $R_1$, $R_2$, $R_3$, and $R_4$ is a lower alkyl group having one to four carbon atoms.

2. The composition of claim 1 wherein the polyhydroxyaromatic compound contains from two to three hydroxy groups.

3. A phosphatizing composition comprising from about 88.0 to about 97.0 percent by weight of trichloroethylene, from about 3.0 to about 12.0 percent by weight n-butanol, from about 0.1 to about 2.0 percent by weight phosphoric acid, from about 0.001 to about 0. percent by weight 4-tert-butylpyrocatechol, and from about 0.0001 to about 0.2 percent by weight N,N'-diethylthiourea.

4. A phosphatizing composition comprising from about 91.0 to about 95.0 percent by weight of trichloroethylene, from about 5.0 to about 9.0 percent by weight n-butanol from about 0.2 to about 1.5 percent by weight phosphoric acid, from about 0.01 to about 0.04 percent by weight 4-tert-butylpyrocatechol, and from about 0.001 to about 0.02 percent by weight N,N'-diethylthiourea.

5. A stabilized phosphatizing composition comprising a chlorinated lower aliphatic hydrocarbon, a cosolvent capable of dissolving phosphoric acid in said hydrocarbon, phosphoric acid, and a polyhydroxyaromatic compound selected from the group consisting of polyhydroxybenzene and polyhydroxynaphthalene compounds containing at least three hydroxy groups.

6. The composition of claim 5 wherein said chlorinated hydrocarbon is trichloroethylene.

7. The composition of claim 5 wherein said chlorinated hydrocarbon is perchloroethylene.

8. The composition of claim 5 wherein said chlorinated hydrocarbon is 1,1,1-trichloroethane.

9. The composition of claim 5 wherein said cosolvent is n-butanol.

10. The composition as claimed in claim 5 wherein said polyhydroxyaromatic compound isc 1,2,3-benzenetriol.

11. A method of phosphatizing metals which comprises contacting the metal with the phosphatizing composition of claim 1.

12. A method of phosphatizing metals which comprises contacting the metal with the phosphatizing composition of claim 5.

13. A method of improving the phosphatizing effects of a chlorinated hydrocarbon non-aqueous phosphatizing solution which comprises mixing said phosphatizing solution with a composition comprising a dihydroxyaromatic compound selected from the group consisting of dihydroxybenzene and dihydroxynaphthalene compounds, and a substance having the following general formula:

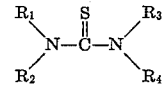

wherein $R_1$, $R_2$, $R_3$ and $R_4$ are substituents selected from the group consisting of hydrogen and lower alkyl groups having one to four carbon atoms, wherein at least one of the substituents $R_1$, $R_2$, $R_3$ and $R_4$ is a lower alkyl group having one to four carbon atoms.

14. The method as claimed in claim 13 wherein the lower alkyl substituted thiourea in the composition with which the phosphatizing solution is mixed is N,N'-diethylthiourea.

15. The method as claimed in claim 13 wherein the composition with which the phosphatizing solution is mixed also contains a halogenated hydrocarbon.

16. A method of improving the phosphatizing effects of a chlorinated hydrocarbon non-aqueous phosphatizing solution which comprises mixing said phosphatizing solution with a composition which comprises, in combination, N,N-diethylthiourea, 4-t-butylpyrocatechol, diisobutylene and a halogenated hydrocarbon.

17. The method as claimed in claim 16 wherein the halogenated hydrocarbon in the composition which is mixed with the phosphatizing solution is trichloroethylene.

18. The method as claimed in claim 16 wherein the halogenated hydrocarbon in the composition which is mixed with the phosphatizing solution is perchloroethylene.

19. The method as claimed in claim 16 wherein the halogenated hydrocarbon in the composition which is mixed with the phosphatizing solution is 1,1,1-trichloroethane.

References Cited by the Examiner
UNITED STATES PATENTS

| | | | |
|---|---|---|---|
| 2,008,680 | 7/1935 | Carlisle et al. | 260—652.5 |
| 2,043,258 | 6/1936 | Missbach | 260—652.5 |
| 2,515,934 | 7/1950 | Verner et al. | 148—6.15 |
| 2,789,070 | 4/1957 | Copelin | 148—6.15 |
| 2,857,298 | 10/1958 | Smith | 148—6.17 |
| 2,992,146 | 7/1961 | Low | 148—6.15 |
| 3,051,595 | 8/1962 | Fullhart et al. | 148—6.15 |
| 3,100,728 | 8/1963 | Vullo et al. | 148—6.15 |

ALFRED L. LEAVITT, *Primary Examiner.*

RICHARD D. NEVIUS, R. S. KENDALL,
*Assistant Examiners.*

UNITED STATES PATENT OFFICE
CERTIFICATE OF CORRECTION

Patent No. 3,297,495                 January 10, 1967

William J. Vullo et al.

It is hereby certified that error appears in the above numbered patent requiring correction and that the said Letters Patent should read as corrected below.

Column 3, line 58, for "ninety-gve" read -- ninety-five -- column 6, lines 10 to 15, the middle structural formula should appear as shown below instead of as in the patent:

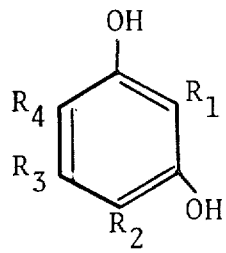

column 8, line 10, for "phhosphatizing" read -- phosphatizing - column 12, line 26, for "Based on" read -- ¹Based on --; column 11 and 12, in the chart, last column, lines 11 and 12, for "Coating very thin, sludge" read -- Coating very thin, no sludge --; column 13, line 2, for "apparance" read -- appearance --; line 41, for "pohsphate" read -- phosphate --; column 14, line 74, for "obects" read -- objects --; column 18, line 13, for "0.001 to about 0." read -- 0.001 to about 0.4 --; line 56, for "isc" read -- is --; column 19, line 15, for "N,N-diethylthiourea" read -- N,N′-diethylthiourea --.

Signed and sealed this 9th day of January 1968.

(SEAL)
Attest:

EDWARD M. FLETCHER, JR.                 EDWARD J. BRENNER
Attesting Officer                       Commissioner of Paten